(12) United States Patent
Wang (10) Patent No.: US 12,068,792 B2
(45) Date of Patent: Aug. 20, 2024

(54) ULTRASONIC ARRAY TRANSCEIVER METHOD AND MODULE THEREOF

(71) Applicant: OPTO TECH CORPORATION, Hsinchu (TW)

(72) Inventor: Di-Bao Wang, Hsinchu (TW)

(*) Notice: Subject to any disclaimer, the term of this patent is extended or adjusted under 35 U.S.C. 154(b) by 33 days.

(21) Appl. No.: 17/902,563

(22) Filed: Sep. 2, 2022

(65) Prior Publication Data

US 2023/0075507 A1 Mar. 9, 2023

(30) Foreign Application Priority Data

Sep. 3, 2021 (TW) ................................ 110132820

(51) Int. Cl.
*H04B 11/00* (2006.01)
(52) U.S. Cl.
CPC .................................. *H04B 11/00* (2013.01)
(58) Field of Classification Search
CPC ........................... H04B 11/00; G06V 40/1306
See application file for complete search history.

(56) References Cited

U.S. PATENT DOCUMENTS

| | | | | |
|---|---|---|---|---|
| 10,275,638 B1* | 4/2019 | Yousefpor | ................ | H04R 1/40 |
| 10,755,067 B2* | 8/2020 | De Foras | ........... | G06V 40/1359 |
| 2017/0344801 A1* | 11/2017 | Zhou | ................... | G06V 40/1365 |
| 2018/0276519 A1* | 9/2018 | Benkley, III | ............ | G06F 21/45 |
| 2020/0134279 A1* | 4/2020 | Hansen | .............. | G06V 40/1306 |
| 2020/0167538 A1* | 5/2020 | Lu | ....................... | G06V 40/1306 |
| 2020/0279087 A1* | 9/2020 | Seo | ..................... | G01S 7/52079 |
| 2021/0209391 A1* | 7/2021 | Bjerre | ..................... | G06F 21/32 |

\* cited by examiner

*Primary Examiner* — Yuqing Xiao
*Assistant Examiner* — Christopher Richard Walker
(74) *Attorney, Agent, or Firm* — MUNCY GEISSLER OLDS & LOWE P.C.

(57) ABSTRACT

The present invention provides an ultrasonic array transceiver method and module thereof. The method includes the step (a) providing an ultrasonic pixel array composed of N×M ultrasonic pixels; step (b), determining the number of a plurality of ultrasonic pixel groups in the ultrasonic pixel array; step (c), generate the first sound wave; step (d), transmit the first sound wave to obtain a plurality of second sound waves; step (e), receive the second sound waves, wherein the ultrasonic pixel received the second sound wave is located at the middle position or adjacent to the middle position of the ultrasonic pixel group; step (f), calculating the second sound waves to generate a pixel signal; step (g), repeating steps (c) to (f); and in step (h), determine an image based on pixel signals.

18 Claims, 11 Drawing Sheets

ULTRASONIC ARRAY TRANSCEIVER METHOD AND MODULE THEREOF

FIELD OF THE INVENTION

The present invention relates to the technical field of ultrasonic sensing and imaging, more particularly, to the ultrasonic array transceiver method and module thereof for the application of wave peaks and wave troughs concerning to biometric characteristics.

BACKGROUND OF THE INVENTION

Traditionally, to provide protection for personal digital information, authentication mechanisms are provided for users on electronic devices, for example, authentication through accounts and passwords, or biometric identification. Among these, biometric authentication is now commonly used and benefits from fast judgement and no memory.

For instance, fingerprint identification is commonly used in biometric authentication, using the user's fingerprints as the identification source. However, with the development of compact electronic devices, how to provide miniaturization, high production yield, electronic components that require high reliability will be a very important issue.

Because of this, the present invention proposes an ultrasonic wave array transceiver method and its module to solve the lack of knowledge of the technology.

SUMMARY OF THE INVENTION

The first objective of the present invention is an ultrasonic array transceiver method to obtain images of wave peaks and troughs related to biometric characteristics to replace, for example, conventional capacitive sensing, and to enhance anti-counterfeiting and use in harsh environments (e.g., a condition of wet fingers).

The second objective of the present invention is, according to the above ultrasonic array transceiver method, the ultrasonic array transceiver module can be packaged to realize biometric image recognition in a thin package/coupling (e.g., package thickness of 300 μm-500 μm), for example, applied to side fingerprint sensing of a portable mobile device or fingerprint sensing of other applications, etc.

The third objective of the present invention is, according to the above ultrasonic array transceiver method, it is capable of performing regional pixel recognition by grouping ultrasonic pixel groups to rapidly perform high-resolution recognition.

The fourth objective of the present invention is, according to the above ultrasonic array transceiver method, is to obtain a partial or complete (or so-called entirely) image related to a biometric characteristic in the transmitting phase (TX-phase) and the receiving phase (RX-phase) by switching between transmitting and receiving in a group of ultrasonic pixels.

The fifth object of the present invention is according to the ultrasonic array transceiver method mentioned above, to receive reflected sound pixels through ultrasonic pixels located in the middle of a group of ultrasonic pixels. The ultrasonic pixels provide a better signal-noise ratio and a clear pixel pattern by obtaining, for example, the largest amplitude of reflected sound among several reflected sound waves.

The sixth objective of the present invention is an ultrasonic array transceiver module capable of implementing an ultrasonic array transceiver method for capturing images of wave peaks and troughs associated with biometric characteristics.

A seventh objective of the present invention is according to the aforesaid ultrasonic array transceiver module, which can be applied to a Piezoelectric Micromachined Ultrasonic Transducers (PMUT) structure or a Capacitive Micromachined Ultrasonic Transducers (CMUT) structure. micromachined ultrasonic transducers (CMUT).

To achieve these and other purposes, the present invention provides an ultrasonic array transceiver method applying wave peaks and wave troughs related to a biometric characteristic, the ultrasonic array transceiver method comprising: (a) providing an ultrasonic pixel array consisting of N×M ultrasonic pixels, wherein the N and the M are integers; (b) determining the number of a plurality of ultrasonic pixel groups in the ultrasonic pixel array, wherein each of the ultrasonic pixel groups comprises n×m of the ultrasonic pixels, wherein the n is not greater than the N and the m is not greater than the M; (c) driving at least one ultrasonic pixel group so that at least one ultrasonic pixel of the ultrasonic pixel group being driven to generate a first sound wave, wherein the first sound wave is generated by at least one ultrasonic pixel, and wherein the generation of the first sound wave by at least one ultrasonic pixel is defined as a transmission phase (TX-phase); (d) the first sound wave radiates in a direction to apply to the wave peak and the wave trough and reflect a plurality of second sound waves; (e) driving at least one ultrasonic pixel producing the first sound wave for receiving the second sound waves, wherein the ultrasonic pixel receiving the second sound waves is located at or near the middle of the ultrasonic pixel group, and the ultrasonic pixel receiving the second sound waves is defined as a reception phase (RX-phase); (f) calculating those second sound waves to generate a pixel signal, wherein the pixel signal is related to the wave peak and the wave trough; (g) repeating steps (c) to (f) so that at least a portion of the ultrasonic pixel groups generate corresponding pixel signals; (h) calculating a plurality of the pixel signals to determine the image corresponding to the whole or a portion of the biometric characteristic.

To achieve these and other purposes, the present invention provides an ultrasonic array transceiver module that acts on the wave peak and wave trough related to a biometric characteristic, the ultrasonic array transceiver module comprising an ultrasonic pixel array, a drive unit, and a control unit. An ultrasonic pixel array has a plurality of ultrasonic pixel groups, each of the ultrasonic pixel groups comprising n×m of ultrasonic pixels, wherein the n and the m are integers. A drive unit connects to the ultrasonic pixel array, the drive unit generating a first drive signal to drive at least one ultrasonic pixel of at least one ultrasonic pixel groups to generate a first sound wave, and the drive unit generates a second drive signal to drive at least one ultrasonic pixel of at least one ultrasonic pixel groups to receive a plurality of second sound wave to generate a pixel signal, wherein the first sound wave is transmitted in a direction close to the wave peak and the wave trough, and the second sound wave is transmitted in a direction away from the wave peak and the wave trough. A control unit is connected to the drive unit, the control unit executes an application to drive the drive unit so that the first drive signal and the second drive signal drive at least one part of the ultrasonic pixel groups, and the control unit executes the application to calculate the pixel signals to generate an image corresponding to whole or partial of the biometric characteristic.

In comparison to the traditional techniques, the present invention provides an ultrasonic array transceiver method and a module thereof to obtain a good quality image of all or part of a biometric characteristic, for instance a fingerprint image, through transmitting sound waves and receiving reflected sound waves. In the present invention, the ultrasonic array transceiver array is further divided into a plurality of ultrasonic pixel groups and ultrasonic pixels in each ultrasonic pixel group are used to transmit and receive sound waves. In one embodiment, in particular, an ultrasonic pixel located, for example, in the middle of the ultrasonic pixel group is selected for reception. By receiving a plurality of reflected sound waves from a plurality of reflected sound waves after they have been applied to a biometric characteristic, and by selecting the best signal (for example the one with the highest amplitude) from the plurality of reflected sound waves to form a pixel signal, the plurality of ultrasonic pixel groups is repeatedly executed to obtain an image of all or part of the biometric characteristic.

DETAILED DESCRIPTION OF THE PREFERRED EMBODIMENTS

To make the description of the present disclosure more detailed and complete, please refer to the attached drawings and the various embodiments described below.

In the present invention, the term "one" or "a" is used to describe the units, components, and assemblies described herein. This is for illustrative purposes only and provides a general meaning to the scope of the present work. Therefore, unless it is obvious that another meaning is intended, such description should be understood to include one, at least one, and the singular also includes the plural.

In the present invention, the terms "comprise", "include", "have", "contain" or any other similar terms are intended to cover non-exclusive inclusions. For example, an element, structure, article, or device containing a plurality of elements is not limited to the elements listed herein but may include other elements not explicitly listed but which are generally inherent in the element, structure, article, or device. In addition, unless explicitly stated to the contrary, the term "or" refers to an inclusive "or" and not to an exclusive "or".

Figure 1:
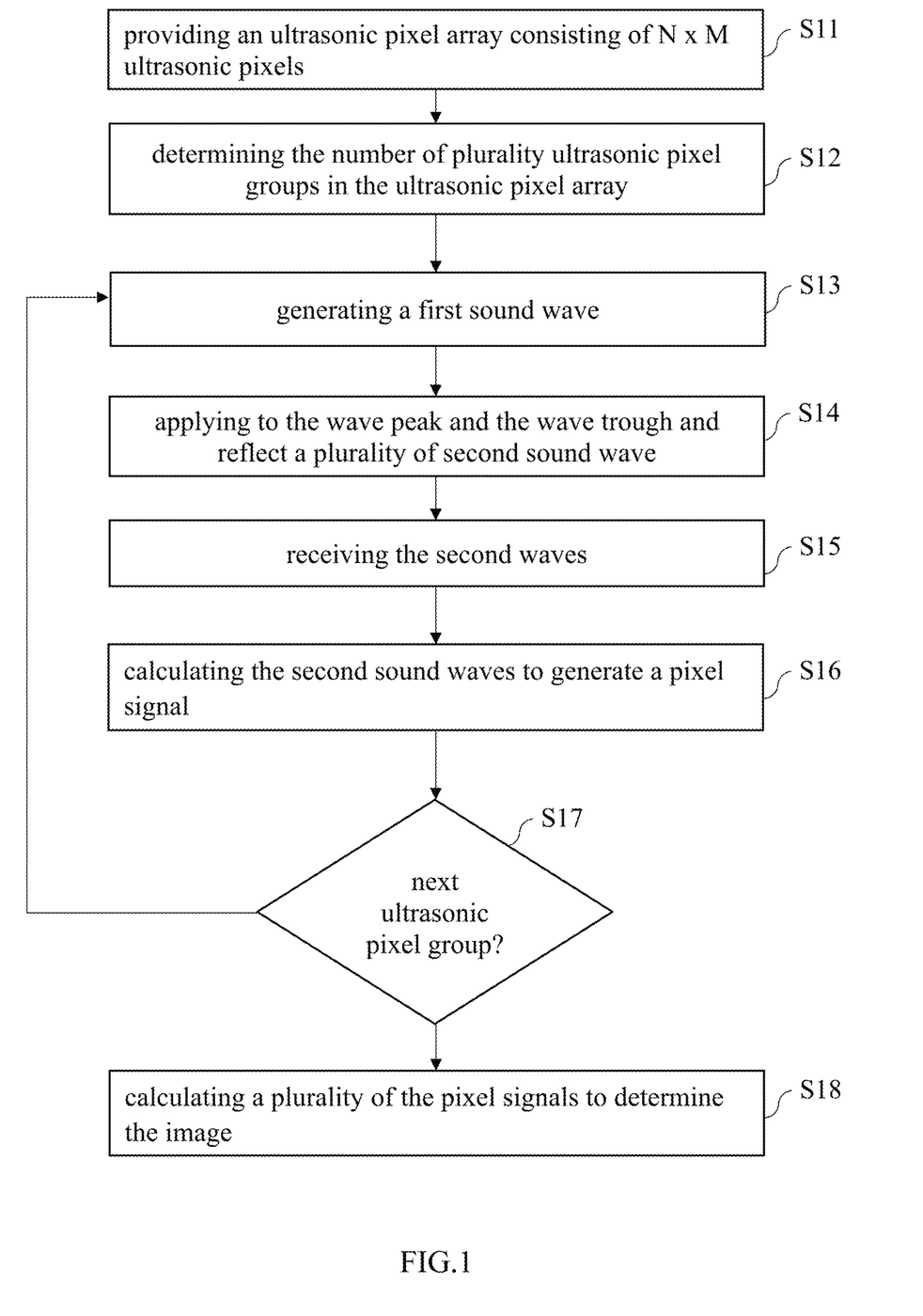
FIG. 1 is a flow chart of an example of the ultrasonic array transceiver method of the present invention.

Referring to FIG. 1 is a flow chart of an example of the ultrasonic array transceiver method of the present invention. In FIG. 1, the ultrasonic wave array transceiver method is applied to the wave peaks and wave troughs associated with the biometric characteristic, for example, fingerprints, palm prints, and so on. In this case, the fingerprints are used as examples.

Figure 2:
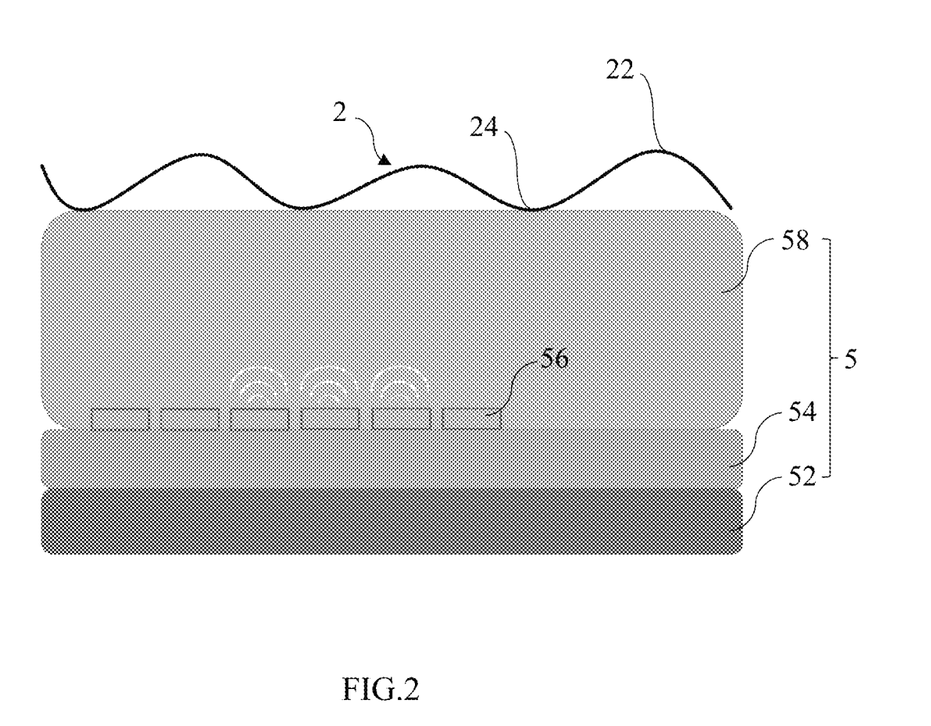
FIG. 2 is a schematic diagram illustrating the structure of the ultrasonic array transceiver module of FIG. 1 of the present invention.

Also, with reference to FIG. 2, a schematic diagram illustrating the structure of the ultrasonic array transceiver module of FIG. 1 of the present invention is shown. In FIG. 2, the ultrasonic array transceiver module 5 is described simply as several structural layers, stacked from the bottom upwards, which are substrate 52, driving and sensing circuit layer 54, ultrasonic pixel array layer 56, and coupling layer 58, etc. Fingerprint 2 is placed on one side of the coupling layer 58 so that the wave peak 22 and wave trough 24 of fingerprint 2 adhere to the coupling layer 58. In the previously mentioned, the coupling layer 58 can be a single layer or be composed of multiple layers and is herein referred to as coupling layer 58 collectively.

Figure 3:
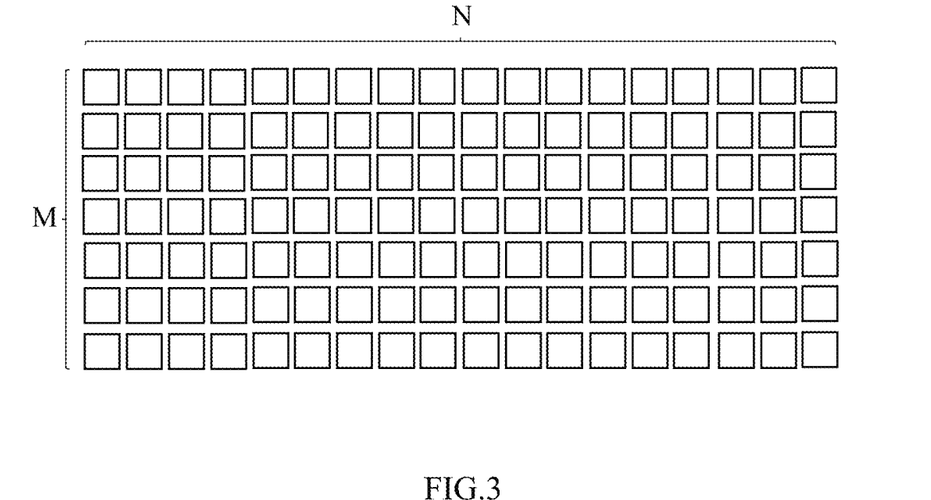
FIG. 3 is a top view of the ultrasonic pixel array of the first embodiment of the present invention.

The ultrasonic array transceiver method is started at step S11, providing an ultrasonic pixel array consisting of N×M ultrasonic pixels, wherein the N and the M are integers, and the N means column and the M means row. For example, N×M can be 160×30, etc. In this case, the 18×7 example is used as an example and reference can also be made to FIG. 3, a top view of the ultrasonic pixel array of the first embodiment of the present invention. In one embodiment, N and M can determine the shape of the ultrasonic pixel array, for example, a rectangular ultrasonic pixel array can be applied to the side edges of a thin electronic product.

Figure 4A:
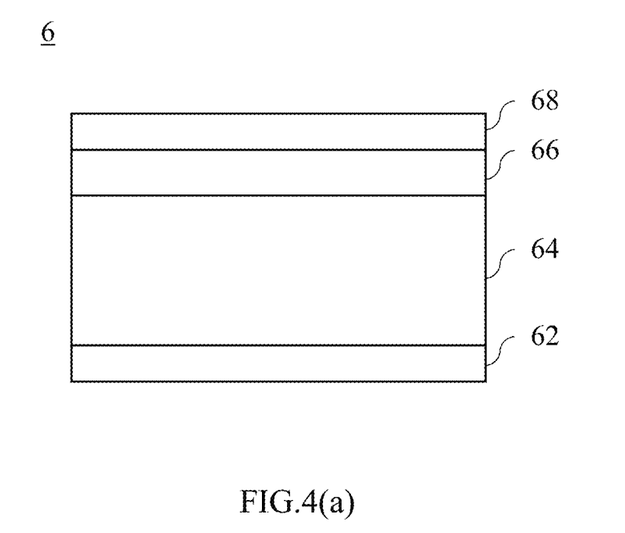
FIG. 4(a) is a schematic diagram illustrating the structure of the ultrasonic pixel of the present invention using a capacitive ultrasonic micro transducer.
Figure 4B:
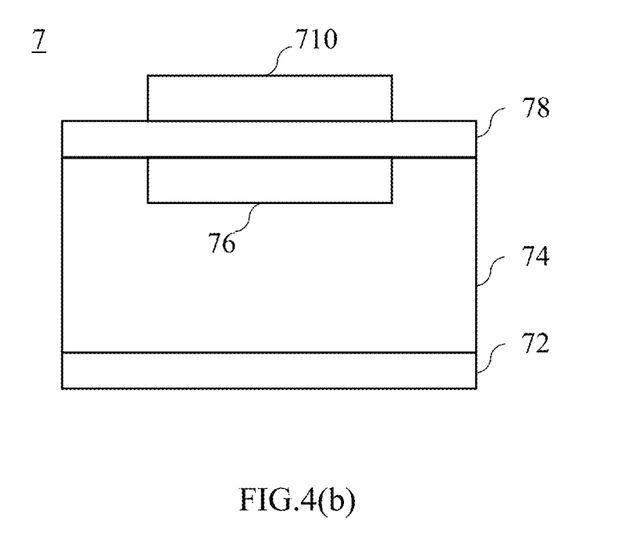
FIG. 4(b) is a schematic diagram illustrating the structure of the ultrasonic pixels of the present invention using a micro-mechanical ultrasonic transducer.

In addition, the ultrasonic pixels are Piezoelectric Micromachined Ultrasonic Transducers (PMUT) structure or Capacitive micromachined ultrasonic transducers (CMUT) structure. Further referring to FIG. 4(a) and FIG. 4(b), the structure of a single ultrasonic pixel in one embodiment of the present invention is illustrated respectively. FIG. 4(a) is a schematic diagram illustrating the structure of the ultrasonic pixel of the present invention using a capacitive ultrasonic micro transducer. FIG. 4(b) is a schematic diagram illustrating the structure of the ultrasonic pixels of the present invention using a micro-mechanical ultrasonic transducer.

In FIG. 4(a), the structure of the capacitive ultrasonic microtransducer 6 starts from the bottom layer of the metal electrode 62, and is composed of gap 64 (gap), dielectric layer 66 (dielectric), and another metal electrode 68 (metal electrode) in sequence. The dielectric layer can be a material for example Silicon Dioxide, Aluminum Oxide, Silicon Nitride, etc., and its thickness is in the range of 0.1 μm to 1.5 μm. The electrodes may be made of metals for example aluminum (Al), nickel (Ni), titanium (Ti), copper (Cu), silver (Ag), other alloys or silicides. The gap (or capacitance gap) is available in a range of thicknesses from 30 μm to 100

μm, depending on the process. The thickness of the gap is in the range of 30 μm to 100 μm and the gap is either filled with gas or under vacuum.

FIG. 4(b) is a schematic diagram illustrating the structure of the ultrasonic pixels of the present invention using a micro-mechanical ultrasonic transducer. The structure of the capacitive ultrasonic microtransducer 7 starts from the bottom substrate 72 (floor structure) and is composed of a gap 74 (gap), a bottom electrode 76 (bottom electrode), a piezoelectric material 78 (piezoelectric material), and a top electrode 710 (top electrode) in sequence. The substrate can be a material such as silicon dioxide, aluminum oxide, silicon nitride, etc., and the thickness of the substrate may be in the range of 0.1 μm to 1.5 μm. The electrode is a metal material such as aluminum, nickel, titanium, copper, silver, molybdenum, or other alloys or silicides, and the thickness of the electrode is in the range of 0.1 μm to 1.5 μm. The gap is as described above and will not be addressed here.

Figure 5:
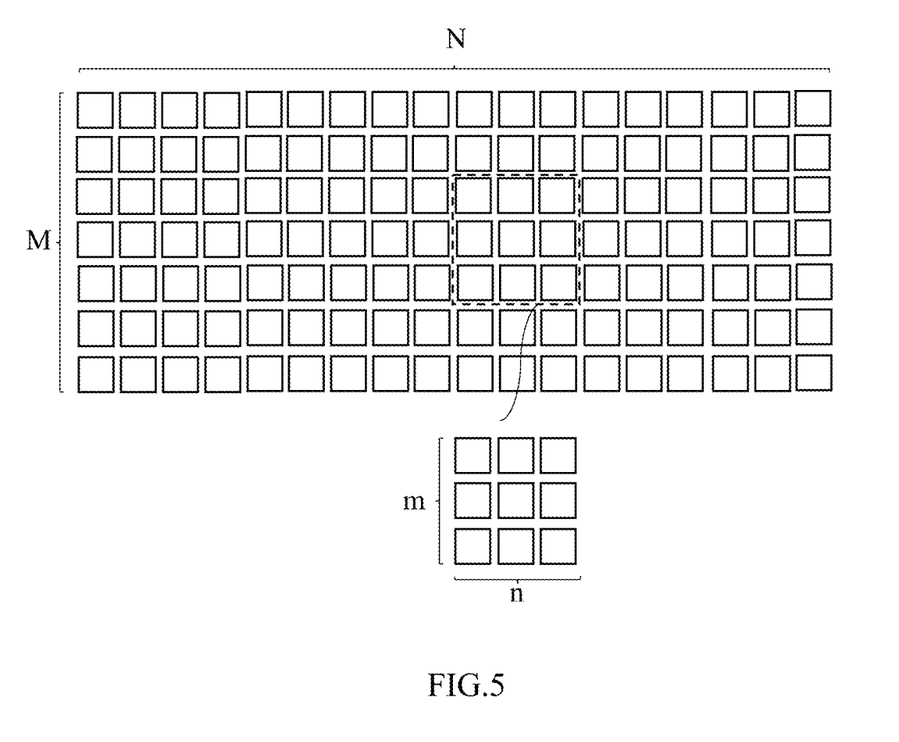
FIG. 5 is a top view of an array of ultrasonic pixels and the ultrasonic pixel groups of an embodiment of the present invention.

In step S12: determining the number of plurality ultrasonic pixel groups in the ultrasonic pixel array, wherein the ultrasonic pixel groups comprise n×m of the ultrasonic pixels. In this case, n refers to a column and m refers to a row. With reference to FIG. 5, is a top view of an array of ultrasonic pixels and a cluster of ultrasonic pixels of an embodiment of the present invention. The n is not greater than the N and the m is not greater than the M. In this step, n×m ultrasound pixels can be chosen as the ultrasonic pixel group flexibly depending on the actual situation. In another embodiment, n and m are odd numbers and n and m are greater than or equal to 3 respectively. In yet another embodiment, n is equal to m so that each of the rows and columns of the plurality of ultrasonic pixel groups contains the same number of ultrasonic pixels, for example, 3×3 or 5×5 ultrasonic pixels are selected as ultrasonic pixel groups.

Figure 6A:
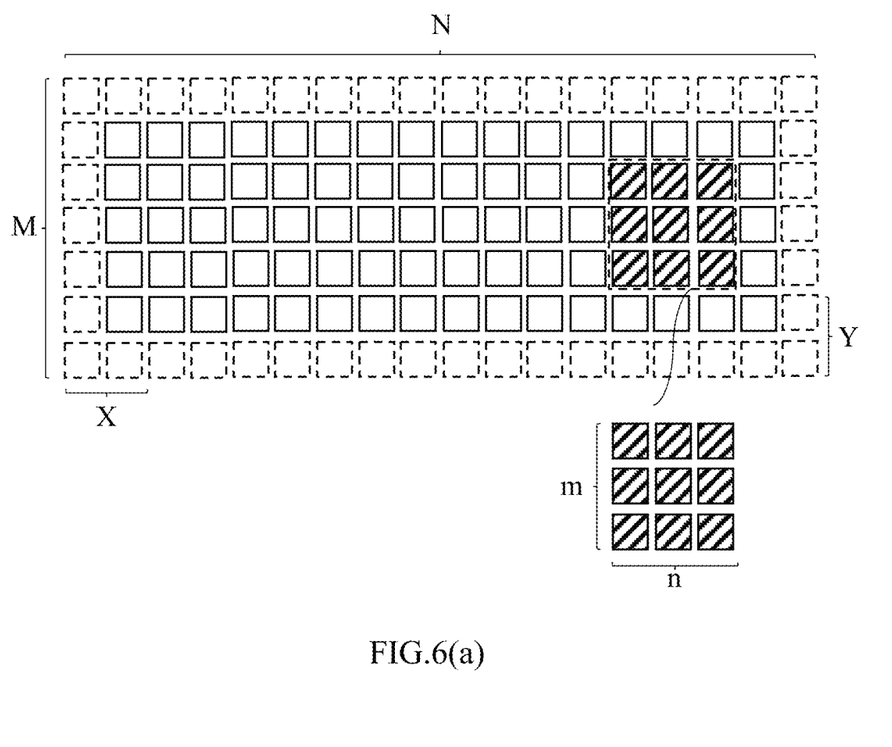
FIG. 6(a) is a top view of an ultrasonic pixel array of another embodiment of FIG. 5 of the present invention.
Figure 6B:
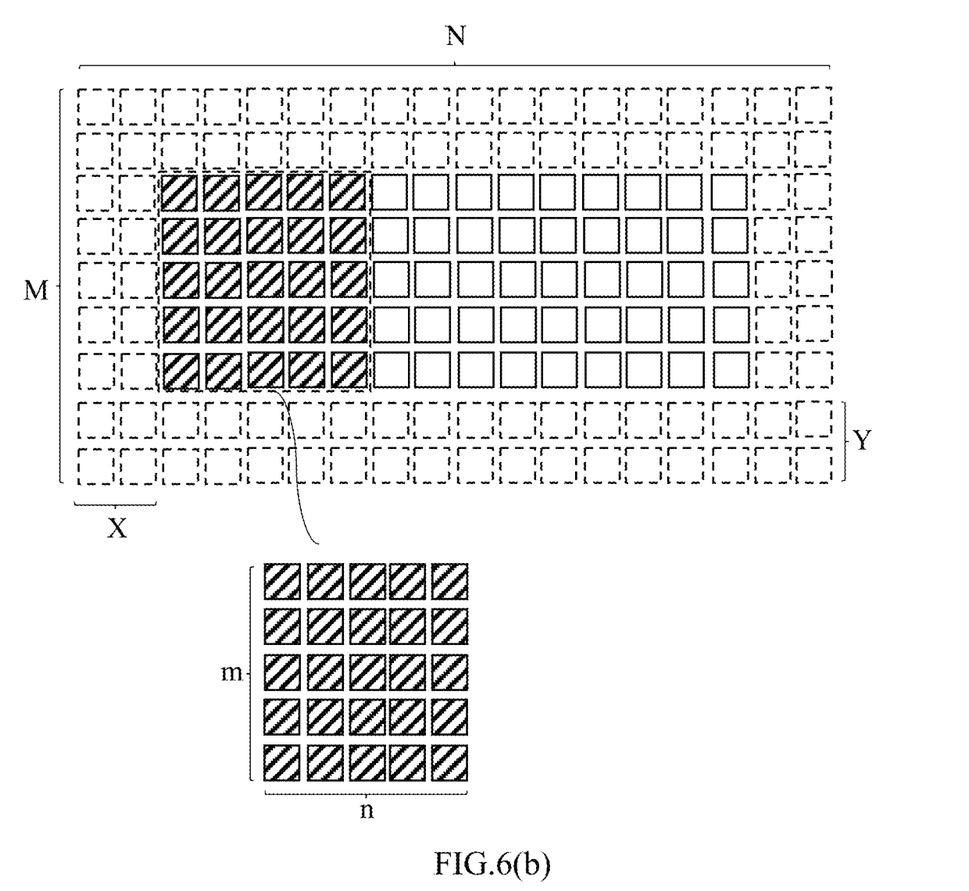
FIG. 6(b) is a top view of an ultrasonic pixel array of another embodiment of FIG. 5 of the present invention.

It should be noted that for better performance, in addition to the entire rows and columns of the ultrasonic pixel array being planned as ultrasonic pixel groups, the rows and columns at the outside edges of the ultrasonic pixel array can also be excluded from being considered as ultrasonic pixel groups. In other words, at least one of the rows and columns of the ultrasonic pixel array may be reduced such that the ultrasonic pixel array is reduced from N×M ultrasonic pixels to an ultrasonic pixel array of (N–X)×(M–Y) ultrasonic pixels, wherein the ultrasonic pixel array of (N–X)×(M–Y) ultrasonic pixels may also be referred to as an effective ultrasonic pixel array. X and Y are integers. X is less than or equal to N and Y is less than or equal to M. For example, with reference to FIGS. 6(a) and 6(b), the top view of the ultrasonic pixel array of the other two embodiments of FIG. 5 of the present invention is illustrated. In FIG. 6(a), an ultrasound pixel group consisting of 3×3 pixels in FIG. 5 is used, wherein n and m are denoted as 3 respectively. Therefore, X and Y are described as 2, so that the ultrasonic pixel array is reduced from 18×7 ultrasonic pixels to an effective ultrasonic pixel array of 16×5 ultrasonic pixels. The reduced portion is indicated by a dashed line, which may also be referred to as the ineffective region. As mentioned above, the number of ultrasound pixels in a cluster can be determined by forming an effective ultrasound pixel array of (N–X)×(M–Y) ultrasound pixels. In FIG. 6(b), a 5×5 ultrasonic pixel group is used, i.e., 5 can be used for the n and m coefficients respectively, and 4 can be used for the X and Y coefficients respectively. In this case, the ultrasound pixel array is illustrated by the example of 18×9 ultrasound pixels. According to the aforementioned selection of X and Y, the ultrasonic pixel array is reduced from 18×9 ultrasonic pixels to an effective ultrasonic pixel array of 15×5 ultrasonic pixels. The reduced inactive area is also indicated by a dashed line.

In step S13, driving at least one ultrasonic pixel of the ultrasonic pixel groups so that at least one ultrasonic pixel of the ultrasonic pixel groups is being driven to generate a first sound wave. For example, the range of driving voltages for driving the ultrasonic pixels is available from several volts to several hundred volts, and the range of frequencies is available from 10 to 30 MHz. Further, the first sound wave is generated by at least one ultrasonic pixel of the ultrasonic pixels, and wherein the generation of the first sound wave by at least one ultrasonic pixel of the ultrasonic pixels is defined as a transmission phase (TX-phase). The first sound wave is the set of sound waves generated by one or more ultrasonic pixels being driven (or oscillated) synchronously and asynchronously. For example, in one embodiment, a sound wave may be a collection of sound waves generated by a plurality of ultrasonic pixels, and the collection of sound waves is a plane wave. In other words, the plurality of ultrasonic pixels is driven in a synchronized or simultaneous way or is driven in an asynchronous or non-simultaneous way.

In step S14, the first sound wave radiates in a direction so as to apply to the wave peak and the wave trough and reflect a plurality of second sound wave SW The aforementioned direction refers to the direction towards the wave peak and wave trough. For example, the aforementioned direction may be perpendicular to the plane of the ultrasonic pixel array, nearly perpendicular (or known as a small angle, i. e. angle less than or equal to 10 degrees) to the plane of the ultrasonic pixel array or non-perpendicular (or known as a large angle, i.e., greater than 10 degrees) to the plane of the ultrasonic pixel array. It should be noted that to obtain a better second sound wave SW, the first sound wave is sent in a direction perpendicular to the plane of the ultrasonic pixel array.

In step S15, driving at least one ultrasonic pixel of the ultrasonic pixels producing the first sound wave for receiving the second wave. In this case, the ultrasonic pixel receiving the second sound wave is located at or near the middle of the ultrasonic pixel groups, and the ultrasonic pixels receiving the second sound wave is defined as a reception phase (RX-phase).

Figure 7A:
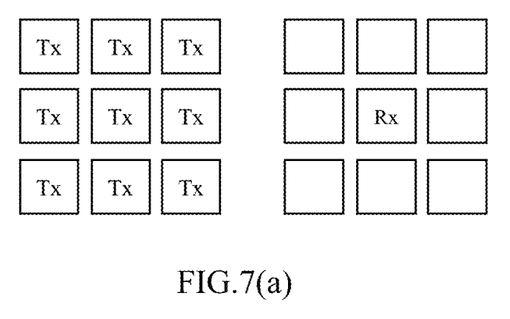
FIGS. 7(a), 7(b) and 7(c) are schematic diagrams of the implementation of the driven ultrasonic pixels of an embodiment of the present invention.
Figure 7B:
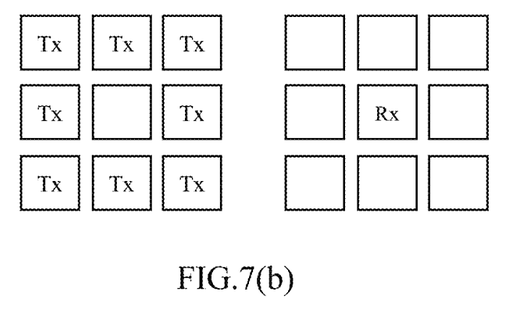
Figure 7C:
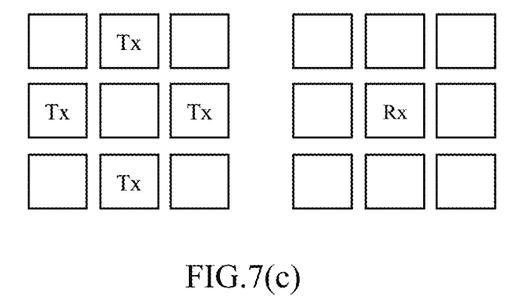

Regarding FIGS. 7(a), 7(b) and 7(c), are schematic diagrams of the implementation of the driven ultrasonic pixels of an embodiment of the present invention. In FIGS. 7(a), 7(b) and 7(c), the left side shows the control state of the driven ultrasonic pixel for transmitting the first sound wave FW and the right side shows the control state of the driven ultrasonic pixel for receiving the second sound wave SW. In this case, it is illustrated by the example of an ultrasonic pixel group of 3×3 ultrasonic pixels, which is also applicable to other n×m ultrasonic pixels. In this regard, the control modes are illustrated by three examples, but there are many variations of the modes which are all within the scope of the invention.

Type 1

In the left side of FIG. 7(a), all the ultrasonic pixels are driven to separately emit the first sound wave, denoted as Tx. On the right side of FIG. 7(a), only the ultrasonic pixels located in the middle of the ultrasonic pixel group are driven to receive the second sound wave, denoted as Rx. In this type, the ultrasonic pixels located in the middle position of the ultrasonic pixel group are driven to emit the first sound wave in the transmitting phase and to receive the second sound wave in the receiving phase, respectively.

Type 2

In the left side of FIG. 7(b), the ultrasound pixels other than the ultrasound pixels located in the middle position of the ultrasound pixel group are driven to emit sound waves to generate the first sound wave, i.e., the ultrasound pixels located in the middle position of the ultrasound pixel group do not emit sound waves. On the right side of FIG. 7(b), only the ultrasonic pixels located in the middle position of the ultrasonic pixel group are driven to receive the second sound wave. In this case, the ultrasonic pixel at the intermediate position of the ultrasonic pixel group is only driven to receive the second sound wave during the receive phase, while no first sound wave is transmitted during the transmitting phase.

Type 3

In the left of FIG. 7(c), the ultrasonic pixels are driven to emit sound waves separately to generate the first sound wave. The first sound wave is not emitted by the ultrasonic pixels located in the middle position of the ultrasonic pixel group, as in the condition of Type 2. On the right side of FIG. 7(c), only the ultrasonic pixels located in the middle position of the ultrasonic pixel group are driven to receive the second sound wave.

Figure 8A:
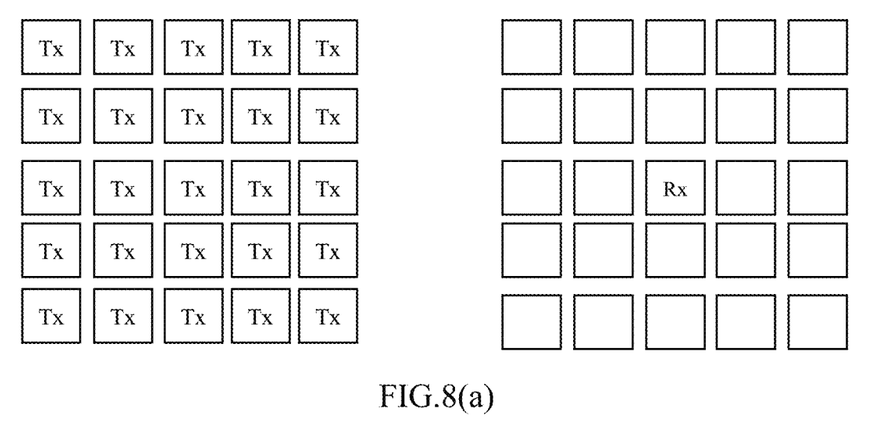
FIGS. 8(b), 8(b) and 8(c) are schematic diagrams of the implementation of a driven ultrasonic pixel of another embodiment of the present invention.
Figure 8B:
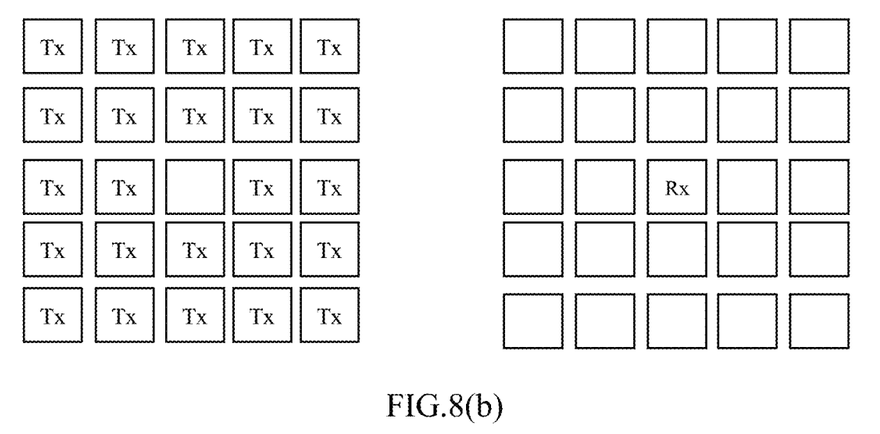
Figure 8C:
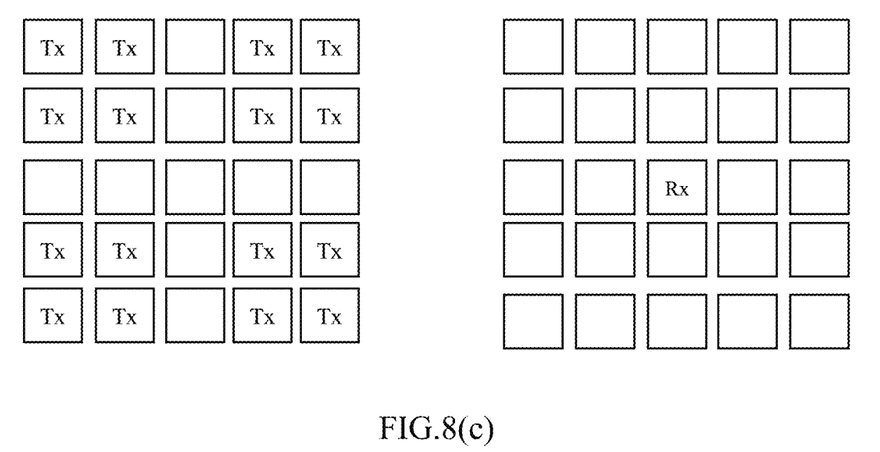

Referring also to FIGS. 8(b), 8(b), and 8(c), schematic diagrams of the implementation of a driven ultrasonic pixel of another embodiment of the present invention. In this case, the example of the ultrasonic pixel group is 5×5 ultrasonic pixels, which also includes the descriptions of Type 1 to Type 3 mentioned above and will not be described here.

Figure 9:
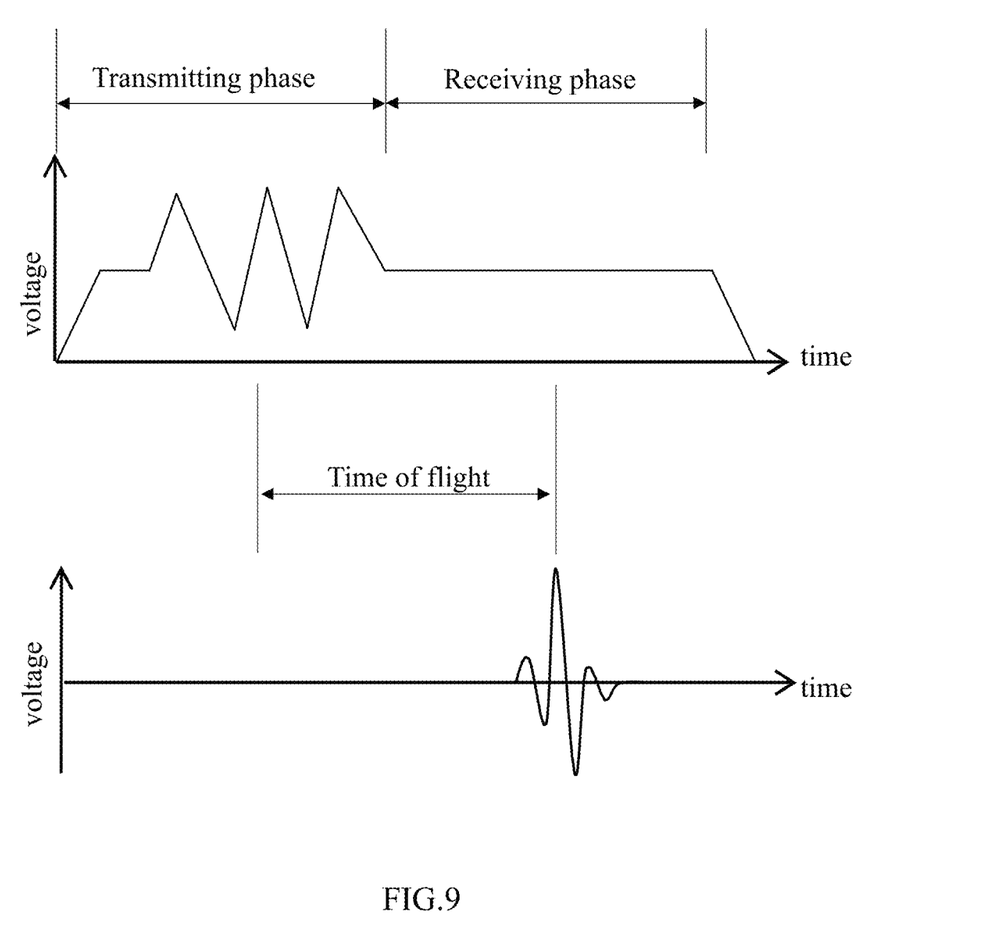
FIG. 9 is a schematic diagram of the driving voltage for generating the first sound and receiving the second sound by the driving ultrasonic pixel of an embodiment of the present invention.

Referring to FIG. 9, a schematic diagram of the driving voltage for driving the ultrasonic pixels to generate the first sound and receive the second sound of an example of the present invention is shown.

In the top diagram of FIG. 9, the vertical axis of the driving voltage diagram is the voltage axis, representing the voltage value (or bias voltage) used to drive the ultrasonic pixels. The voltage can be driven by Direct current (DC), pulsed (plus), or alternating current (AC). The horizontal axis is the time axis, representing the variation of the voltage value driving the ultrasonic pixels at a given time. Furthermore, the vertical and horizontal axes of the bottom diagram of the driving voltage are defined similarly to the top diagram of FIG. 9, but the difference is that the vertical axis of the top diagram shows the variation of the first sound wave sent by the driving ultrasonic pixel, while the vertical axis of the bottom diagram shows the variation of the first sound wave sent by the driving ultrasonic pixel. The vertical axis of the bottom diagram shows the variation in the voltage value used as the driving ultrasonic pixel to receive the second sound wave. Furthermore, in the top and bottom diagrams of FIG. 9, three phases are shown, which, in addition to the TX-phase and RX-phase already mentioned, also include a time of flight, which defines the waiting time between the transmission of the first sound wave and the reception of the strongest amplitude (current or voltage pattern). In one embodiment, in the transmitting phase, a way of driving the ultrasonic pixels may be to stop the ultrasonic pixels from transmitting the first sound wave immediately after driving the ultrasonic pixels to generate the first sound wave and, after the ultrasonic pixels stop transmitting the first sound wave, to allow the ultrasonic pixel groups to switch from the transmission phase to the reception phase to wait for the second sound wave.

In step S16, calculating the second sound waves to generate a pixel signal, wherein the pixel signal is related to the wave peak and the wave trough In step S17, repeating steps S13 to S16 so that at least a portion of the ultrasonic pixel groups are generated to corresponding to the pixel signal. In the preceding step, it is the step of obtaining a pixel signal of part of a fingerprint from ultrasonic pixel groups consisting of n×m ultrasonic pixels. To obtain the pixel signals of the other parts of the fingerprint, it is still necessary to obtain the corresponding pixel signals through the next ultrasonic pixel group. There are various ways of driving, such as sequential driving or scanning driving. In the sequence-driven method, only one ultrasonic pixel group is driven at a time, and by switching between different wires, the driving voltage can be applied to the next ultrasonic pixel group, thus allowing only one set of drive unit and control unit for driving, thus saving circuit layout and costs. In another embodiment, each ultrasonic pixel group can also be provided with a separate driver and control unit. Furthermore, the next ultrasonic pixel group mentioned herewith can be designed according to the practical requirements. For example, take the ultrasound pixel array in FIG. 2. After a single ultrasonic pixel group has been actuated, it is possible to select a group of ultrasonic pixels located to the left, right, top, bottom, or even diagonally. It is worth noting that one or more ultrasonic pixel groups can be selected to drive at one time.

In step S18, calculating a plurality of the pixel signals to determine the image corresponding to the whole or a portion of the biometric characteristic.

Figure 10:
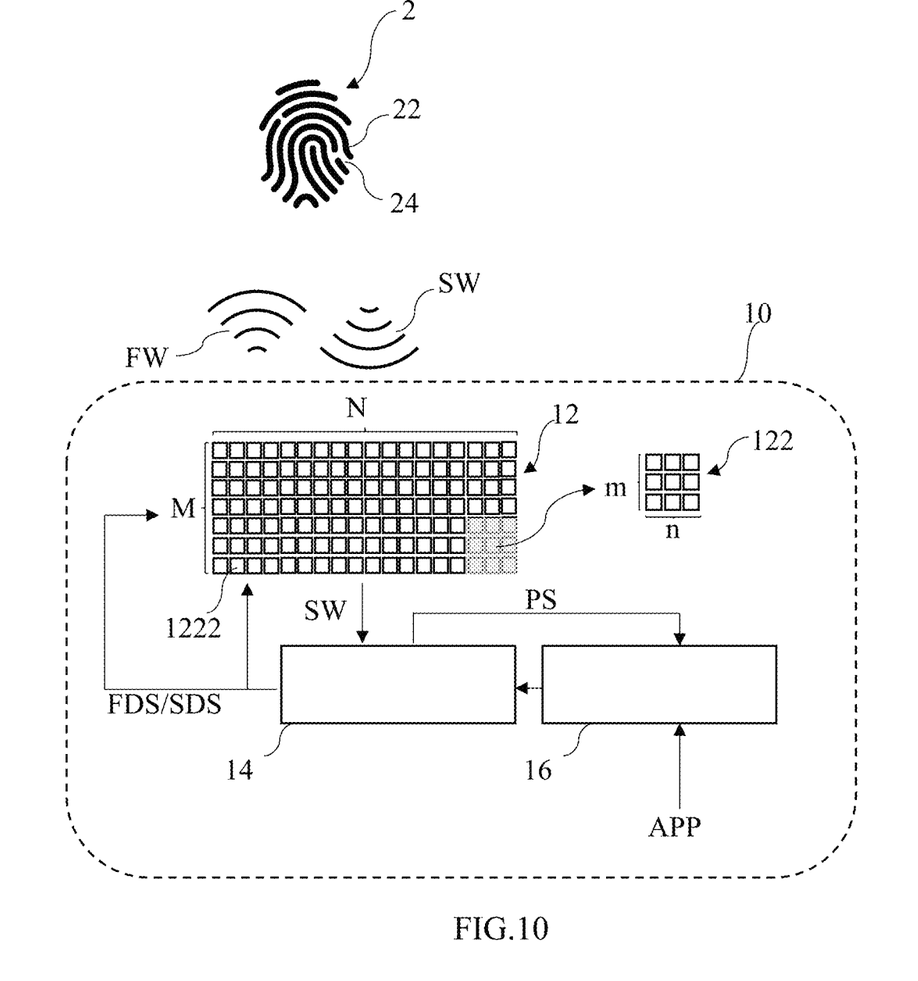
FIG. 10 is a block diagram of the ultrasonic array transceiver module of an embodiment of the present invention.

FIG. 10 is a block diagram of the ultrasonic array transceiver module of an embodiment of the present invention. In FIG. 10, the ultrasonic array transceiver module 10 acts on wave peak 22 and wave trough 24 corresponding to the biometric characteristic, such as a fingerprint 2.

The ultrasound array transceiver module 10 comprises an ultrasonic pixel array 12, a drive unit 14, and a control unit 16.

The ultrasonic pixel array 12 comprises a plurality of ultrasonic pixel group 122, and each ultrasonic pixel group 122 comprises n×m ultrasonic pixel 1222, where n and m are integers. In one example, n and m are odd numbers, the n and m are greater than or equal to 3 respectively, and the n and m are odd numbers such as 3, 5, 7, 9, etc. In another embodiment, n equals m such that the number of ultrasonic pixels in the rows of the ultrasonic pixel population equals the number of ultrasonic pixels in the columns, in a symmetrical arrangement.

The drive unit 14 is connected to the ultrasonic pixel array 12. The drive unit 14 generates a first drive signal FDS to drive the ultrasonic pixel 1222 located in the ultrasonic pixel group 122 to generate the first sound wave FW and drive unit 14 generates a second drive signal SDS to drive the ultrasonic pixel 1222 of the same ultrasonic pixel group 122 to receive a plurality of second sound wave SW to generate the pixel signal PS, wherein, the first sound wave FW is transmitted in a direction close to the wave peak 22 and wave trough 24, and the plurality of second sound wave SW is transmitted in a direction away from the wave peak 22 and wave trough 24. As mentioned above, if n and m are odd numbers, the drive unit 14 can select ultrasonic pixel 1222 in the middle of each ultrasonic pixel group 122 to receive the second sound wave SW. The first drive signal FDS is at least one of a sinusoidal wave, a tone-burst wave, or a square wave, and the drive frequency of the first drive signal FDS is at least tens of MHz. Preferably, the drive frequency can be in the range of 10 MHz to 50 MHz.

Further, the drive unit 14 generates a first drive signal FDS to synchronously drive the ultrasonic pixel group 122 of the ultrasonic pixel population 122 to generate a plurality of first sound wave FW, such that the first sound wave FW are superimposed as the plane-like wave or plane wave. Thus, the number of ultrasonic pixel group 122 driven synchronously further determines whether the stacked plurality of first sound FWs is a plane-like wave or a plane wave, e.g., the more driven the closer to a plane wave.

It is worth noting that drive unit 14 may in fact include at least one of a signal amplification circuit, a filter circuit, a DC source generation circuit, an AC source generation circuit, a peak detection circuit, a digital/class conversion circuit, or an analog/digital conversion circuit, etc., to perform electrical signal processing of these second sound waves, for example, the signal amplifier circuit amplifies the signal received by the ultrasonic pixel 1222, the filter circuit filters the signal noise, the DC source generation circuit generates DC bias voltage, the AC source generation circuit generates AC bias voltage, the peak detection circuit detects or identifies the amplitude of the signal, the digital/analog conversion circuit converts the digital signal into an analog signal, and the analog/digital conversion circuit converts the analog signal into a digital signal. Since the drive unit can select one or more circuits as described above depending on the circuit design, the circuit type is not limited here.

The control unit 16 is connected to the drive unit 14. The control unit 16 executes an application APP to drive the drive unit 14 such that the first drive signal FDS and the second drive signal SDS drive at least a portion of the plurality of ultrasonic pixel groups 122, and the control unit 16 executes the application APP to the algorithm the pixel signals PS to generate image 26 corresponding to all or a portion of the biometric characteristics, such as fingerprint 2. In one embodiment, the control unit 16 sequentially drives each ultrasonic pixel group 122 with the first drive signal FDS and the second drive signal SDS according to the application APP.

The ultrasound array transceiver module 10 comprises a coupling layer (not shown) covering the ultrasonic pixel array 12, wherein, the coupling layer having a thickness for forming a cavity between the biometric characteristic and the ultrasonic pixel array. The coupling layer is composed of a layer of material or a multi-layer material structure.

The present invention is disclosed above by preferred embodiments. However, persons skilled in the art should understand that the preferred embodiments are illustrative of the present invention only but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. An ultrasonic array transceiver method applying wave peaks and wave troughs related to a biometric characteristic, the ultrasonic array transceiver method comprising:
   (a) providing an ultrasonic pixel array consisting of N×M ultrasonic pixels, wherein the N and the M are integers;
   (b) determining the number of a plurality of ultrasonic pixel groups in the ultrasonic pixel array, wherein each of the ultrasonic pixel groups comprises n×m of the ultrasonic pixels, wherein the n is not greater than the N and the m is not greater than the M, and the n and the m are odd and the n and the m are respectively not less than 3;
   (c) driving at least one ultrasonic pixel group so that at least one ultrasonic pixel of the ultrasonic pixel group being driven to generate a first sound wave, wherein the first sound wave is generated by at least one ultrasonic pixel, and wherein the generation of the first sound wave by at least one ultrasonic pixel is defined as a transmission phase (TX-phase);
   (d) the first sound wave radiates in a direction to apply to the wave peaks and the wave troughs and reflect a plurality of second sound waves;
   (e) driving at least one ultrasonic pixel producing the first sound wave for receiving the second sound waves, wherein the ultrasonic pixel receiving the second sound waves is only located at or near the middle of the ultrasonic pixel group, and the ultrasonic pixel receiving the second sound waves is defined as a reception phase (RX-phase);
   (f) calculating those second sound waves to generate a pixel signal, wherein the pixel signal is related to the wave peaks and the wave troughs;
   (g) repeating steps (c) to (f) so that at least a portion of the ultrasonic pixel groups generate corresponding pixel signals; and
   (h) calculating a plurality of the pixel signals to determine an image corresponding to the whole or a portion of the biometric characteristic.

2. The method of claim 1, wherein the step (b) further comprising reducing at least one of the rows and columns of the ultrasonic pixel array so that the ultrasonic pixel array is reduced from an array of N×M ultrasonic pixels to an array of (N−X) ×(M−Y) ultrasonic pixels, wherein the X and the Y are integers and the X is not greater than the N and the Y is not greater than the M.

3. The method of claim 2, wherein the rows and the columns of the ultrasonic pixel array are reduced are located at the outer edges of the ultrasonic pixel array.

4. The method of claim 2, wherein the step (b) further comprises determining the number of ultrasonic pixel groups in the ultrasonic pixel array formed by (N−X)×(M−Y) of the ultrasonic pixel.

5. The method of claim 1, wherein the n is equal to the m so that each of the rows and the columns of each of the ultrasonic pixel groups have the same number of the ultrasonic pixels.

6. The method of claim 5, wherein the n is equal to the m, the ultrasonic pixel located in the middle of the ultrasonic pixel groups receives the second sound wave, wherein the ultrasonic pixel located in the middle of the ultrasonic pixel groups selectively serves as a source of emission of the first sound wave.

7. The method of claim 1, wherein the step (c) further comprising stopping the generation of the first sound wave by the ultrasonic pixel in the ultrasonic pixel group after the first sound wave has been generated by the ultrasonic pixel.

8. The method of claim 7, prior to step (e), further comprising allowing the ultrasonic pixel groups to switch from the transmission phase to the reception phase after the generation of the first sound is stopped, so as to wait for the second sound wave.

9. The method of claim 1, wherein the step (f) further comprising obtaining a second wave with maximum amplitude from the second waves, so as to calculate the pixel signal.

10. An ultrasonic array transceiver module that acts on wave peaks and wave troughs related to a biometric characteristic, the ultrasonic array transceiver module comprising:
   an ultrasonic pixel array having a plurality of ultrasonic pixel groups, each of the ultrasonic pixel groups comprising n×m of ultrasonic pixels, wherein the n and the m are integers, and the n and the m are odd and the n and the m are respectively not less than 3;

a drive unit being connected to the ultrasonic pixel array, wherein the drive unit generates a first drive signal to drive at least one ultrasonic pixel of at least one ultrasonic pixel groups to generate a first sound wave, and wherein the drive unit generates a second drive signal to drive at least one ultrasonic pixel of at least one ultrasonic pixel groups to receive a plurality of second sound wave to generate a pixel signal, wherein the first sound wave is transmitted in a direction close to the wave peak and the wave trough, and the second sound wave is transmitted in a direction away from the wave peaks and the wave troughs, and wherein the ultrasonic pixel receiving the second sound waves is only located at or near the middle of the ultrasonic pixel group; and a control unit being connected to the drive unit, wherein the control unit executes an application to drive the drive unit so that the first drive signal and the second drive signal drive at least one part of the ultrasonic pixel groups, and wherein the control unit executes the application to calculate the pixel signals to generate an image corresponding to whole or partial of the biometric characteristic.

11. The ultrasonic array transceiver module of claim 10, wherein the drive unit further comprises at least one of a signal amplifier circuit, a filter circuit, a DC source generation circuit, an AC source generation circuit, a wave peak detection circuit, a digital/analogue conversion circuit or an analogue/digital conversion circuit for an electrical signal processing of such second sound waves.

12. The ultrasonic array transceiver module of claim 10, wherein the n is equal to the m so that each of the rows and the columns of each of the ultrasonic pixel groups have the same number of the ultrasonic pixels.

13. The ultrasonic array transceiver module of claim 12, wherein the ultrasonic pixel in the middle of each the ultrasonic pixel groups are selected to receive the second sound wave.

14. The ultrasonic array transceiver module of claim 10, wherein the control unit drives each of the ultrasonic pixel groups with the first drive signal and the second drive signal in sequence according to the application.

15. The ultrasonic array transceiver module of claim 10, wherein the ultrasonic pixels are Piezoelectric Micromachined Ultrasonic Transducers (PMUT) structure or Capacitive micromachined ultrasonic transducers (CMUT) structure.

16. The ultrasonic array transceiver module of claim 10, further comprising a coupling layer covering the ultrasonic pixel array, the coupling layer having a thickness for forming a cavity between the biometric characteristic and the ultrasonic pixel array, wherein the coupling layer is composed of a layer of material or a multi-layer material structure.

17. The ultrasonic array transceiver module of claim 10, wherein the drive unit generates a first drive signal to synchronously drive the ultrasonic pixels of the ultrasonic pixel groups to generate a plurality of the first sound waves so that the first sound waves are overlapped into a planar wave-like wave or a plane wave.

18. The ultrasonic array transceiver module of claim 10, wherein the first drive signal is at least one of sinusoidal wave, tone-burst wave, and square wave.

* * * * *